(12) United States Patent
Najmolhoda et al.

(10) Patent No.: US 8,387,644 B2
(45) Date of Patent: Mar. 5, 2013

(54) SOLENOID OPERATED FLUID CONTROL VALVE

(75) Inventors: Hamid Najmolhoda, Grand Rapids, MI (US); David L. Seid, Conklin, MI (US)

(73) Assignee: Saturn Electronics & Engineering, Inc., Auburn Hills, MI (US)

( * ) Notice: Subject to any disclaimer, the term of this patent is extended or adjusted under 35 U.S.C. 154(b) by 989 days.

(21) Appl. No.: 12/069,013

(22) Filed: Feb. 6, 2008

(65) Prior Publication Data

US 2008/0258090 A1     Oct. 23, 2008

Related U.S. Application Data

(60) Provisional application No. 60/900,650, filed on Feb. 9, 2007.

(51) Int. Cl.
  *F15B 13/043*    (2006.01)
  *F01L 1/34*      (2006.01)
  *B01D 35/06*     (2006.01)

(52) U.S. Cl. ............... 137/1; 137/325.64; 123/90.17; 192/3.57; 210/222

(58) Field of Classification Search ............... 137/544, 137/625.64, 1; 251/30.03, 30.04; 210/222; 123/90.12, 90.17; 192/3.57
  See application file for complete search history.

(56) References Cited

U.S. PATENT DOCUMENTS

| | | | | |
|---|---|---|---|---|
| 2,962,002 A * | 11/1960 | Hayner | .................... | 137/625.64 |
| 3,245,424 A * | 4/1966 | Olsen | ........................ | 137/625.64 |
| 3,443,594 A * | 5/1969 | Frayer | ....................... | 137/625.64 |
| 4,074,699 A * | 2/1978 | Stampfli | .................. | 137/625.64 |
| 4,313,468 A * | 2/1982 | Patel | ........................ | 137/625.64 |
| 4,494,726 A * | 1/1985 | Kumar et al. | ............... | 251/30.04 |
| 4,674,613 A * | 6/1987 | Sikorski | ..................... | 137/625.64 |
| 4,988,074 A | 1/1991 | Najmoldhoda | | |
| 5,051,631 A * | 9/1991 | Anderson | ................ | 137/625.64 |
| 5,417,241 A * | 5/1995 | Tischer et al. | ............ | 137/625.68 |
| 5,611,370 A | 3/1997 | Najmolhoda | ............ | 137/625.61 |
| 5,611,371 A * | 3/1997 | Wirtz | ........................ | 137/625.64 |
| 5,913,577 A * | 6/1999 | Arndt | ........................ | 137/625.64 |
| 5,984,259 A | 11/1999 | Najmolhoda et al. | .......... | 251/50 |
| 5,996,628 A | 12/1999 | Najmolhoda et al. | ... | 137/625.61 |
| 6,131,475 A * | 10/2000 | Riedhammer | ........... | 137/625.64 |
| 6,179,268 B1 | 1/2001 | Seid | ............................... | 123/65 |
| 6,209,563 B1 | 4/2001 | Seid et al. | ................... | 137/15.21 |
| 6,289,921 B1 * | 9/2001 | Neuhaus et al. | ......... | 137/625.68 |
| 6,315,268 B1 * | 11/2001 | Cornea et al. | ............ | 137/625.68 |
| 6,321,767 B1 | 11/2001 | Seid et al. | ................... | 137/15.21 |
| 6,337,012 B1 | 1/2002 | Devine | .......................... | 210/223 |
| 6,543,481 B2 * | 4/2003 | Neff et al. | ................. | 137/625.64 |
| 6,581,634 B2 | 6/2003 | Najmolhoda et al. | ........ | 137/545 |
| 6,640,834 B1 | 11/2003 | Hamkins | | |
| 6,928,967 B2 | 8/2005 | Daut | ............................. | 123/90.12 |
| 2002/0189575 A1 | 12/2002 | Rayl et al. | .................. | 123/198 F |
| 2005/0139273 A1 * | 6/2005 | Morselli | .................. | 137/625.64 |
| 2006/0054225 A1 * | 3/2006 | Hillesheim et al. | ...... | 137/625.64 |
| 2006/0075983 A1 * | 4/2006 | Schmitt | ....................... | 123/90.17 |

FOREIGN PATENT DOCUMENTS

| | | |
|---|---|---|
| DE | 101 53 247 A | 5/2003 |
| GB | 861 078 | 2/1961 |
| WO | WO 97/09275 | 3/1997 |

* cited by examiner

*Primary Examiner* — John Rivell (57) ABSTRACT

Solenoid operated fluid control valve for a cam phasing mechanism of an internal combustion engine includes first and second control ports, a 2-stage hydraulically pilot-actuated, pressure balanced spool having an integral control feedback passage and a linear force solenoid actuator operably coupled to a pilot valve of a pilot stage. The spool valve includes an exhaust path common to pilot and spool exhaust passages.

23 Claims, 7 Drawing Sheets

METERING BALL OPEN
(PRIMARY SUPPLY VENTED FULLY TO EXHAUST)

Spool Position B

Figure 5

SOLENOID OPERATED FLUID CONTROL VALVE

This application claims benefits and priority of provisional application Ser. No. 60/900,650 filed Feb. 9, 2007, the disclosure of which is incorporated herein by reference.

FIELD OF THE INVENTION

The present invention relates to a solenoid operated fluid control valve (electrohydraulic valve) for use with a fluid actuated mechanism, such as a variable cam phasing mechanism of an internal combustion engine.

BACKGROUND OF THE INVENTION

A proportional variable force solenoid control valve that is relative low in cost to manufacture and compact in size while maintaining substantially linear proportional fluid control is described in the Najmolhoda U.S. Pat. No. 4,988,074.

The proportional variable force control valve includes a ferromagnetic (e.g. steel) armature suspended by low spring rate springs at opposite ends of the armature within the bore hole of a coreless solenoid bobbin for reciprocable movement between a first valve position and a second valve position in response to applied electrical current to an electromagnetic coil. The position of the armature is controlled by balancing the variable force of an electromagnetic field of an electromagnetic coil and the force of the magnetic field of a permanent ring magnet against the force of a compression coil spring which biases the valve toward the closed position of the valve. The electromagnetic coil, bobbin and armature reside in a solenoid housing. The fluid control valve on the end of the armature moves relative to a valve seat disposed in the valve housing to communicate a fluid inlet to fluid exhaust ports so as to regulate fluid pressure at fluid control ports in a manner proportional to the magnitude of applied electrical current.

A commercially manufactured version of the aforementioned patented proportional variable force solenoid fluid control valve has been modified to include a stainless steel ball valve and a separate stainless steel valve seat insert pressed in the nozzle. The ball valve is captured in a stainless steel valve cage between the valve seat and a rod-like, cylindrical shaped steel armature that moves relative to the valve seat in a manner proportional to the magnitude of electrical current applied to the electromagnetic coil. As the armature moves relative to the valve seat to actuate the valve, the ball valve is caused to follow the end of the armature by virtue of fluid pressure in the valve member housing and confinement in the ball valve cage in the bobbin. The fluid inlet is communicated to fluid exhaust ports by opening of the ball valve so as to regulate fluid pressure at fluid control ports in a manner proportional to the magnitude of electrical current applied to the coil.

A spool valve is disposed in the valve member housing for providing a two stage, high flow capability wherein pressurized fluid supplied to the inlet port initially is directed to bypass the control ports and flows to an end of the spool valve to move it from a zero fluid flow spool position to a maximum fluid flow spool position relative to the control ports as determined by the cracking pressure preset for the ball valve by adjustment of the coil spring force. Thereafter, a second stage of operation involves controlling the fluid flow through the control ports by moving the spool valve between minimum and maximum flow spool positions in a manner proportional to the magnitude of electrical current to the coil.

The Najmolhoda U.S. Pat. No. 5,984,259 describes a proportional variable force solenoid control valve that includes a damping member connected to or part of the armature to provide improved valve response stability to noise in the controlled fluid system, especially in use in an electronically controlled hydraulic automatic transmission application.

Variable cam phase adjustment mechanisms are known for changing the timing of the valve train of an internal combustion engine. Such cam phasing systems have used high flow, 4 port VBS variable bleed solenoids that generally utilize a direct acting spool and armature subassembly due the complex hydraulic porting required for 2 control ports. Such designs have very low output forces and can be susceptible to friction/lodging due to contaminants. A direct acting (single stage) 4-way solenoid operated valve for use with a cam phasing mechanism is described in U.S. Pat. No. 6,640,834. Such designs have very low output forces as a result of direct action of the armature on the spring-biased spool and can be susceptible to friction/lodging due to contaminants.

SUMMARY OF THE INVENTION

The present invention provides a solenoid operated fluid control valve for use with a variable cam phasing mechanism of an internal combustion engine, with a transmission clutch control system, or with other fluid actuated mechanisms.

Pursuant to an illustrative embodiment of the invention, the solenoid fluid control valve comprises first and second control ports, a two-stage (hydraulically pilot-actuated), pressure balanced spool having an integral control feedback passage communicated to one of the control ports and having a spool supply recess for communication to one or the other of the first and second control ports depending on a first position or a second position of the spool, and a linear force solenoid actuator motor for controlling a pilot valve that controls movement of the spool between the first position and the second position where the first and second ports both are communicated to the spool supply recess.

Pursuant to another illustrative embodiment of the invention, the solenoid fluid control valve comprises a two-stage (hydraulically pilot-actuated) spool having an exhaust path common to pilot and spool exhaust passages, and a solenoid actuator motor operably associated with a pilot valve.

The solenoid fluid control valve pursuant to the invention provides high flow capability, higher control pressure resolution, much higher hydraulic forces acting on the spool, much reduced hydraulic hysteresis, fast transient pressure response due to low inductance generated by a coil/permanent magnet motor, and can achieve smaller package size requirements.

An optional particle gettering magnet can also be packaged with the control valve for higher robustness with respect to external contamination.

The foregoing and other features and advantages of the invention will become apparent from the following more detailed description taken with the accompanying following drawings.

DESCRIPTION OF THE INVENTION

The present invention provides a solenoid operated fluid control valve (electrohydraulic valve) for use with a variable cam phasing mechanism of an internal combustion engine, with a transmission clutch control system, or with other fluid actuated mechanisms.

Pursuant to an illustrative embodiment of the invention, the solenoid fluid control valve 10 comprises a 2-stage (hydraulically pilot-actuated), pressure balanced spool 67 with integral pressure feedback coupled to a linear force solenoid actuator motor 14.

The solenoid actuator motor 14 is of the type described in U.S. Pat. No. 5,984,259, the teachings of which are incorporated herein by reference. For example, the solenoid actuator motor includes a steel (or other ferromagnetic material) solenoid housing 19b and certain solenoid components residing in the housing. For example, an electromagnetic solenoid coil 16 is wound about a molded plastic bobbin 18 which has a cylindrically shaped bore hole 18a through the longitudinal axis thereof. The bobbin 18 is made of glass filled thermoplastic or other suitable material. An axially elongated armature 22 formed of a ferromagnetic material (e.g. magnetically permeable steel) is suspended within the bore hole 18a by a thin low spring rate spring 24 mounted at a rear, outermost end 22a of the armature.

The inner periphery of the plate spring 24 is mounted by annular retainer 23 and retainer 27 mounted to the rear, outer end 22a of the armature 22. The outer periphery of the plate spring 24 is mounted between the radially enlarged annular end flange 18h of the coil bobbin 18 and an opposing annular end of housing cap or closure 46. The housing includes an annular end flange 19e overlying the cap or closure 46.

An inner end of the armature 22 is formed to include or have attached thereto a fluid damping member 25 that, in turn, engages a steel ball metering valve (pilot valve) 38 disposed in a damping and exhaust chamber 27. Ball metering valve (pilot valve) 38 cooperates with an annular valve seat 23a located about an axial orifice of a ball valve cage insert 23 pressed in intermediate valve housing 19c. The ball valve 38 and the valve seat 23a define a fluid diverting valve for diverting or venting fluid pressure to exhaust port E as described below. A permanent magnet 34 is disposed about an opposite remote end of the armature 22 proximate the solenoid coil 16. An optional carbon steel flux washer W can be provided in a recess in bobbin 18 to concentrate electromagnetic flux at the inner end of the armature. Ball valve 38 is received and confined laterally in the cage insert 23 between the end of the armature damping member 25 and the valve seat 23a. The armature 22 is biased by coil compression spring 42 against the ball valve 38. The ball valve 38 follows movement of the armature 22 in a direction away from (or toward) the valve seat 23a by virtue of the fluid pressure on the ball valve and by virtue of being captured in the insert 23.

Coil compression spring 42 (spring biasing means) is trapped in a cylindrical armature counterbore between the axial armature end 22a and a central axially extending projection 46a of the housing cap or closure 46.

A plastic electrical connector body 52 is mounted on the bobbin 18 and exits the solenoid housing via a suitable opening 19f. Electrical contacts 54 (only one shown) extend through the bobbin 18 and through apertures in the connector body 52. The ends of the electrical contacts are connected to the wires of the electromagnet coil 16 for receiving an electrical current signal, such as for example a pulse width modulated signal, from a control module, such as a powertrain control module. For example, contacts can be connected to a powertrain control module of a motor vehicle to control engine flow to a cam phasing mechanism. Cam phasing mechanisms are commercially available from various manufacturers.

The valve housing 19a includes a longitudinal bore of generally cylindrical configuration for receiving a spool 67 in close-fit, sliding manner for axial movement therein. The spool 67 includes exhaust passages SE', SE, SE" with the axial longitudinal exhaust passage SE closed off at one end by fixed closure plug 67c.

The valve housing 19a itself can be disposed in a manifold (not shown) of a cam phasing mechanism or other fluid actuated mechanism. Outer O-ring seals (not shown) may be provided between the valve housing 19a and manifold at suitable locations if needed to separate the supply, control and exhaust ports, passages, chambers, etc. of the manifold. Spool includes annular spool primary supply recess 67p and annular spool recesses 67r, 67s, 67t separated by spool sealing surfaces 68a, 68b, 68c, 68d.

The valve housing 19a includes a pressurized supply port S, first and second axially spaced apart control ports C1 and C2, and exhaust port E. In use with a cam phasing mechanism of an internal combustion engine, a supply passage can extend from an engine oil pump to supply port S. The exhaust port E can be communicated to the oil pan of the engine. The first and second control ports C1, C2 can communicate with respective inlet ports 11, 12 of a conventional cam phasing mechanism CPM, FIG. 2A.

Figure 1:
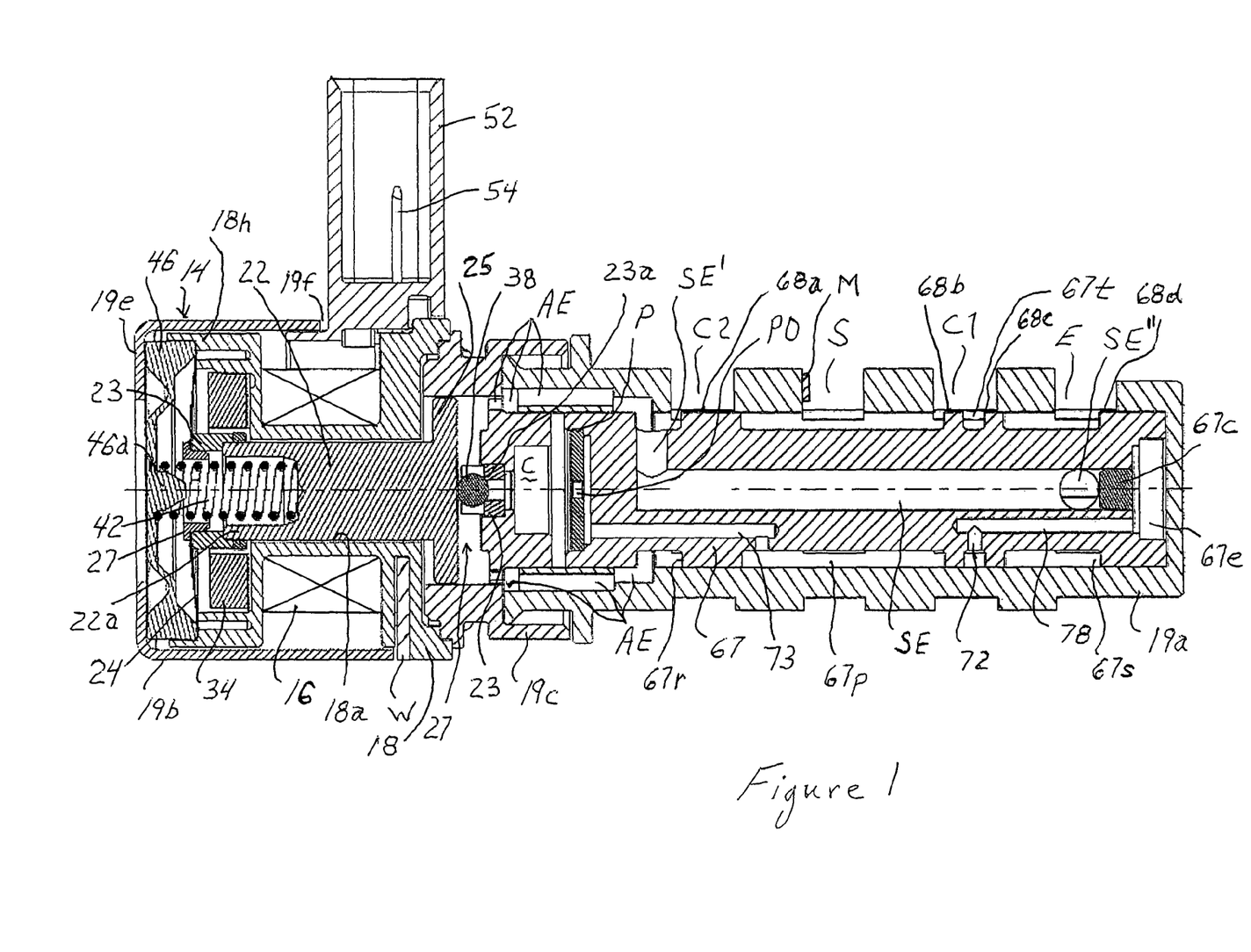
FIG. 1 is longitudinal cross-section view of a fluid control valve illustrating certain embodiments of the present invention showing the spool in a position A where supply pressure is open to control port C1, control port C1 is communicated to the control feedback passage, control port C1 is closed to exhaust, supply pressure is closed to control port C2, and control port C2 is open to exhaust.
Figure 1A:
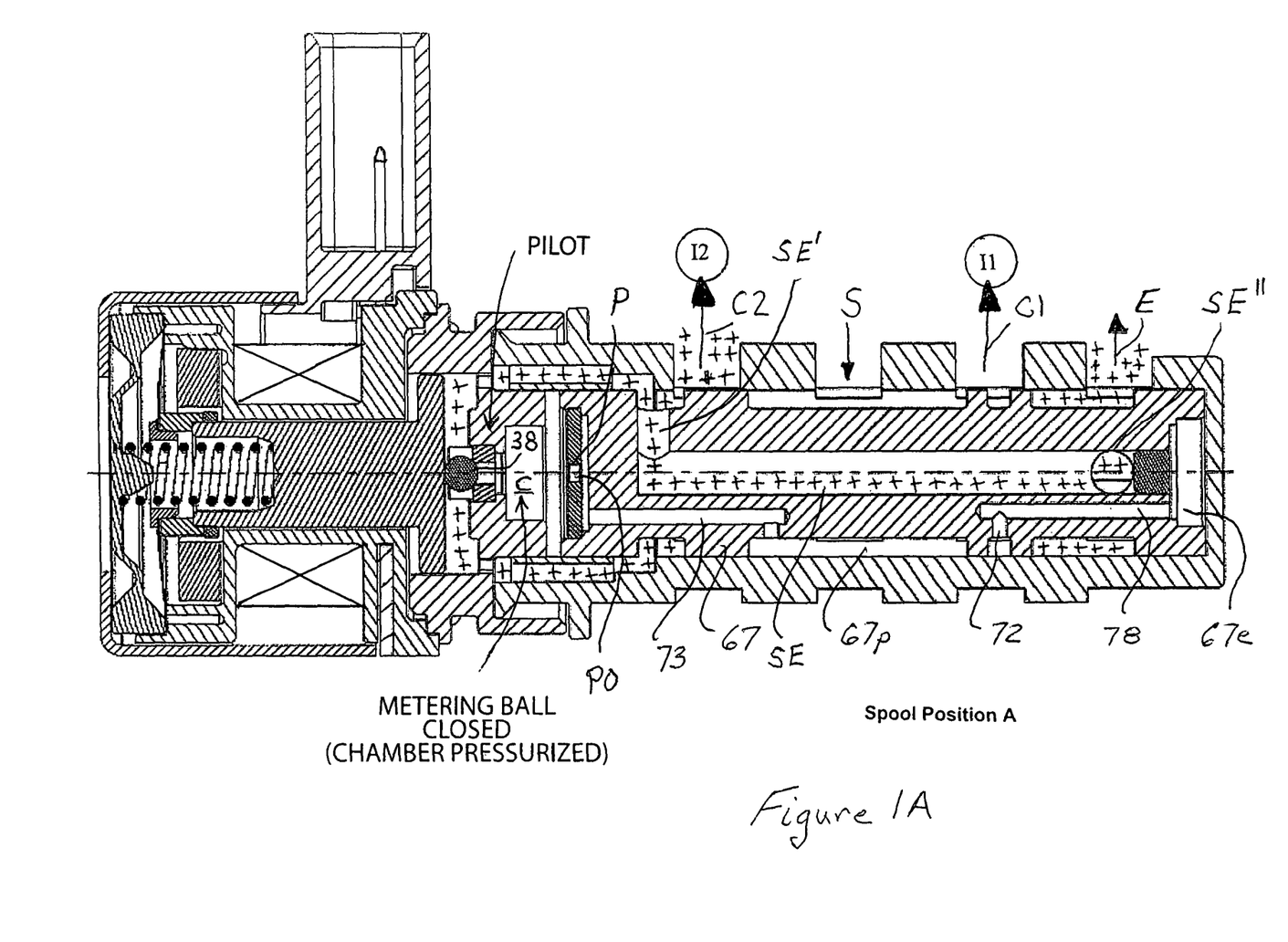
FIG. 1A is similar to FIG. 1 and shows chambers, passages etc. where hydraulic supply pressure is present (as designated by white regions) and chambers, passages etc. communicated to exhaust (as designated by regions with overlying +++++ signs).
Figure 2:
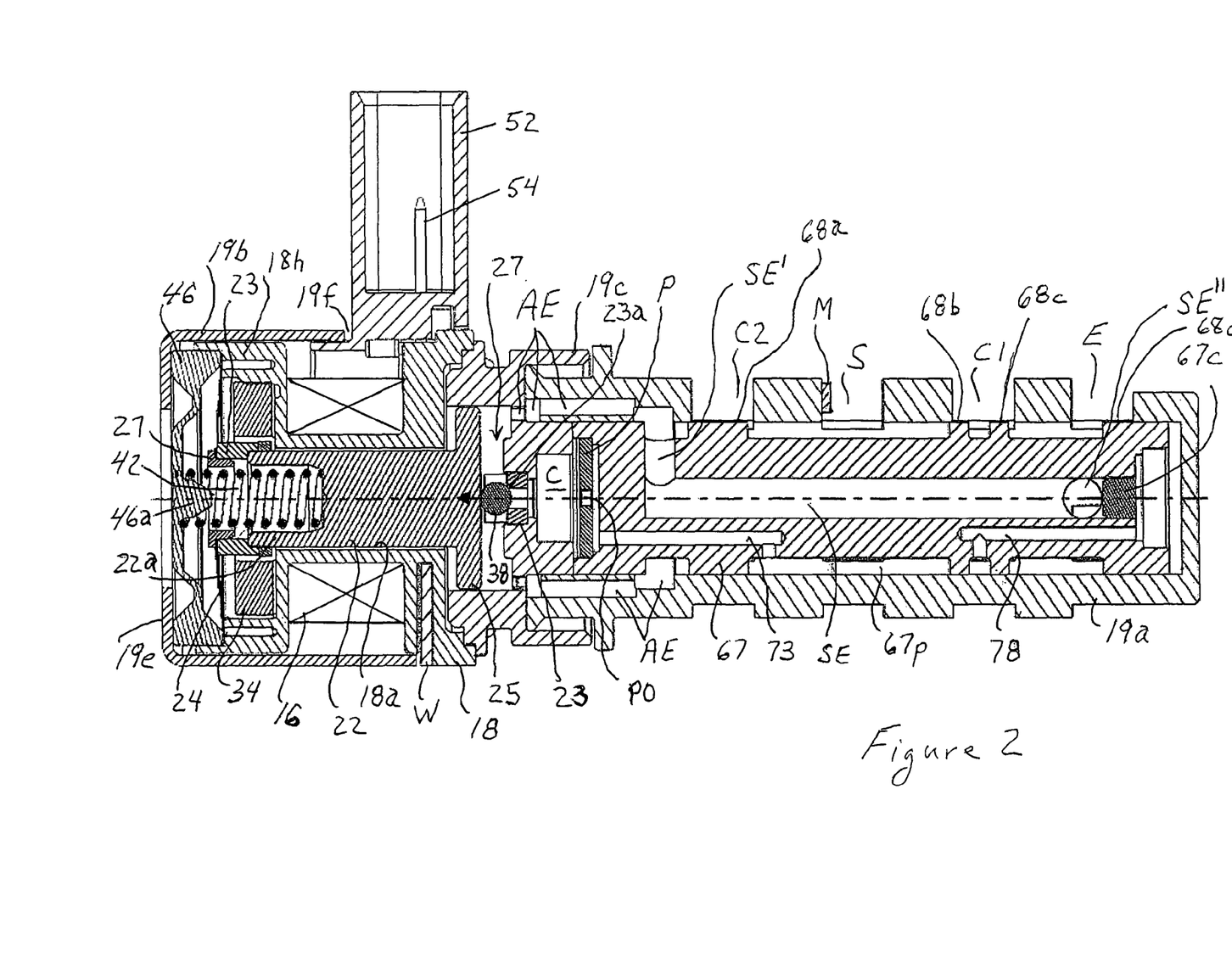
FIG. 2 is longitudinal cross-section view of a fluid control valve illustrating certain embodiments of the present invention showing the spool in a position B where supply pressure is open to control port C2, control port C2 is closed to exhaust, supply pressure is closed to control port C1, and control port C1 is open to exhaust with control feedback passage routed to exhaust.

The slidable spool 67 is disposed in the longitudinal bore of the valve housing 19a for movement between axial position A and axial position B shown in FIGS. 1 and 2, respectively. For example, the spool valve 67 is shown in position A in FIGS. 1 and 1A where supply pressure port S is open via recess 67p to control port C1, control port C1 is closed by surface 68c to exhaust port E, supply pressure port S is closed by surface 68a to control port C2, and control port C2 is open by recess 67r to exhaust with ball metering valve (pilot valve) 38 closed on valve seat 23a by bias of coil spring 42 with the coil 16 deenergized. In this axial position A, fluid pressure is provided at the end chamber 67e of the spool as illustrated in FIG.

1A wherein the control port C1 is communicated to control feedback passage 78 via the port 72 shown. Chamber 67e can include an optional coil compression spring (not shown). The spool primary supply recess 67p feeds fluid pressure to the second stage pilot chamber C to pressurize it via a primary supply passage 73 and orifice plug P having orifice PO such that the spool is pressure balanced.

Figure 2A:
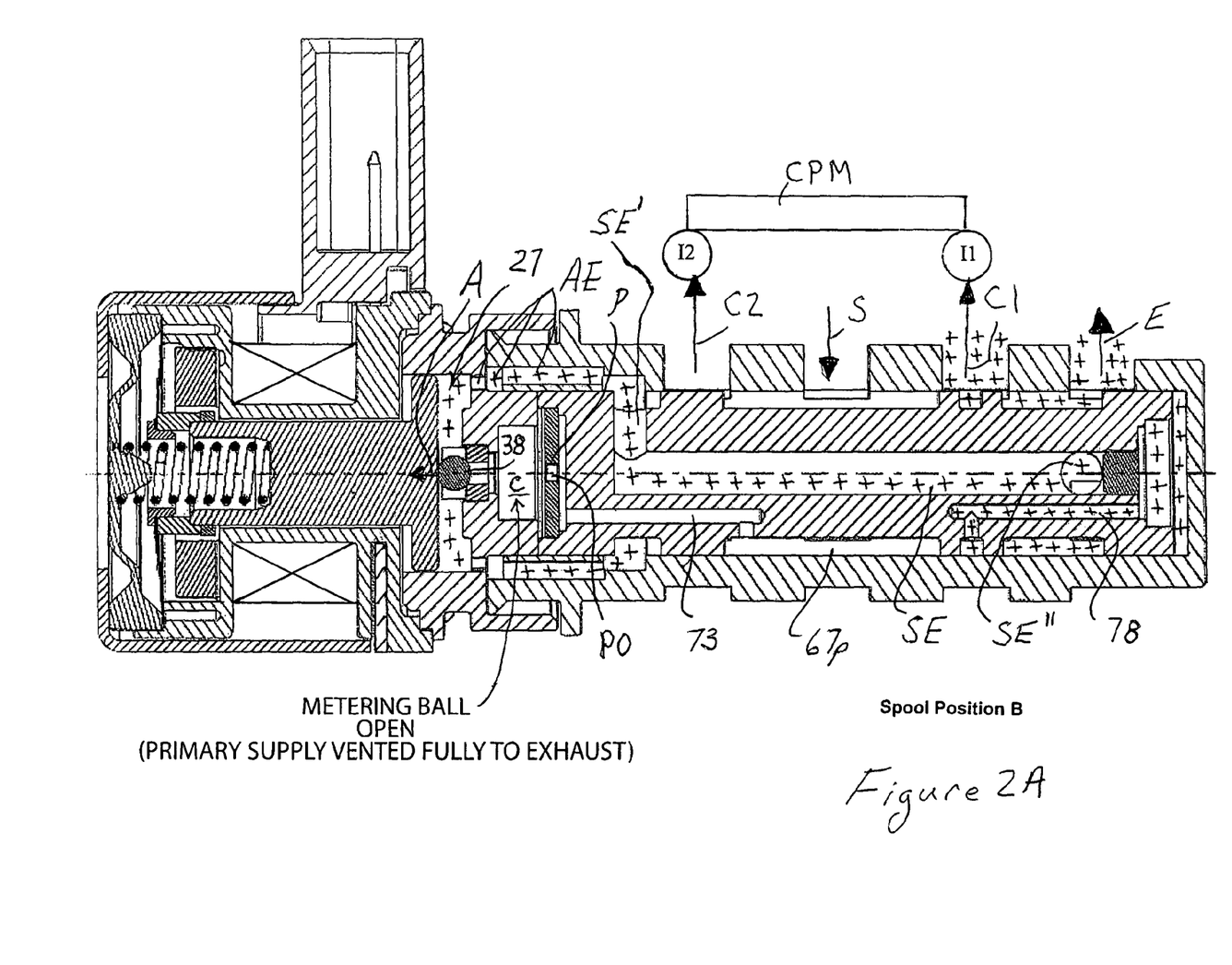
FIG. 2A is similar to FIG. 1 and shows chambers, passages etc. where hydraulic supply pressure is present (as designated by white regions) and chambers, passages etc. communicated to exhaust (as designated by regions with overlying +++++ signs).

The spool 67 is shown in axial position B in FIGS. 2 and 2A where supply pressure port S is open by recess 67p to control port C2, control port C2 is closed by surface 68a to exhaust, supply pressure port S is closed by surface 68b to control port C1, and control port C1 is open by recess 67s to exhaust port E with control pressure feedback passage 78 being routed to exhaust port E. Although not shown, the metering ball valve 38 in position B is open relative to seat 23a in the direction of arrow A, FIG. 2A, by electrical current being provided to the solenoid coil 16. The spool primary supply recess 67p feeds fluid pressure to the second stage pilot chamber C via spool passage 73 and orifice plug P and is fully vented to exhaust via pilot exhaust chamber 27 and pilot exhaust passages AE formed by valve housings 19a, 19c and communicating with first radial exhaust passage SE', axial exhaust passage SE, and end radial exhaust passage SE" of spool 67. The radial exhaust passage SE" communicates to the exhaust port E. The spool 67 thereby provides an exhaust circuit (path) that is common to the pilot and second stage (spool) exhaust passages as shown in FIGS. 1A, 2A.

Movement of the spool 67 between position A and position B can be controlled by supplying varying electrical current to solenoid coil 16 to move the armature 22 and thus the ball metering valve 38 to open or close relative to seat 23a. For example, electrical current can be supplied to the coil 16 to create an electromagnetic field which, in addition to the force of fluid pressure on the ball valve, overcome the coil spring 42 to move the armature 22 and thus ball metering valve 38 and spool 67 in a linear proportional manner as described in U.S. Pat. No. 5,984,259. Since the ball valve 38 moves with the armature 22, the ball valve 38 can be opened relative to seat 23a in linear proportional manner to the varied electrical current applied to the coil 16 to divert or vent fluid pressure from pilot chamber C through the valve seat orifice out through the pilot exhaust passages AE and spool exhaust passages SE', SE, SE" to control spool movement in a manner that both control ports C1, C2 are communicated to spool recess 67p between positions A and B to provide hydraulic pressures at the control ports that vary in generally linear proportional manner; e.g. see FIGS. 3 and 4.

Figure 3:
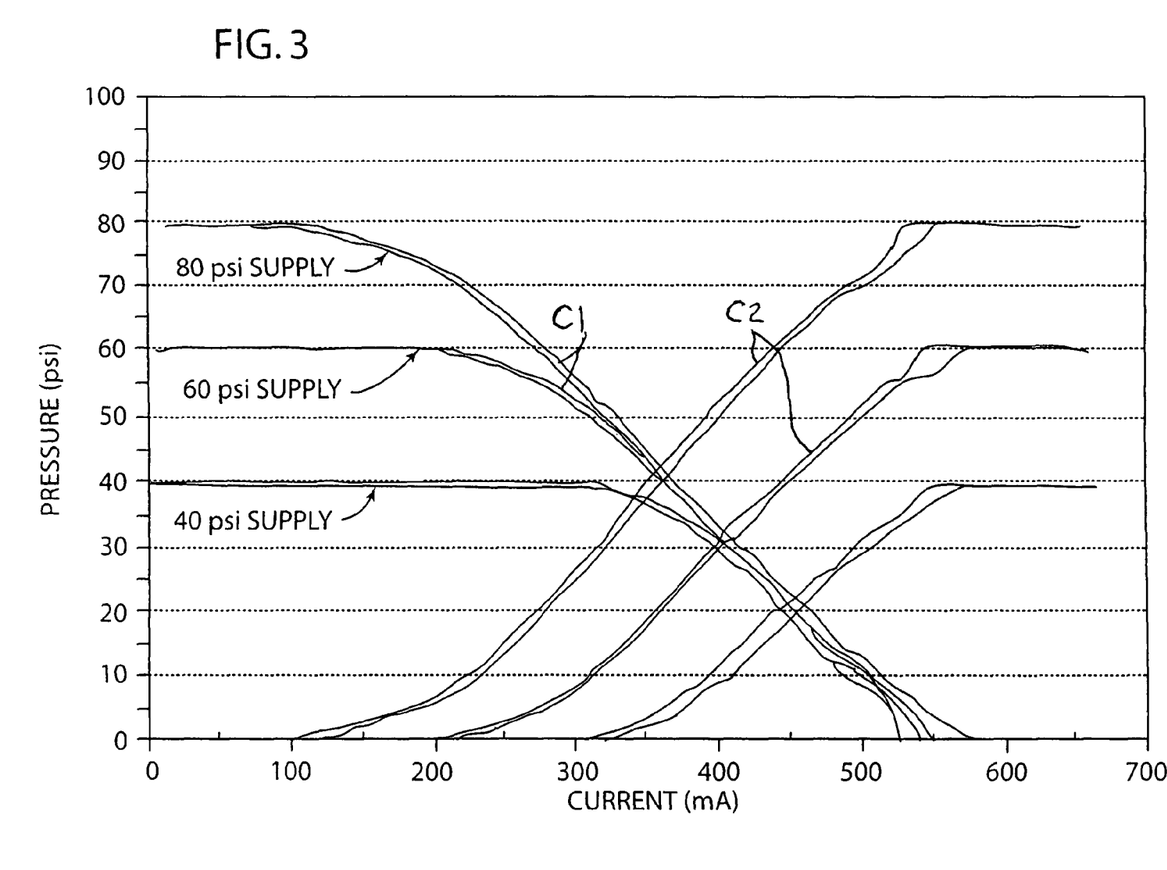
FIG. 3 is a graph of solenoid current versus pressures at the control ports at a supply pressure of 40 psi, 60 psi, and 80 psi for a fluid control valve pursuant to the invention.
Figure 4:
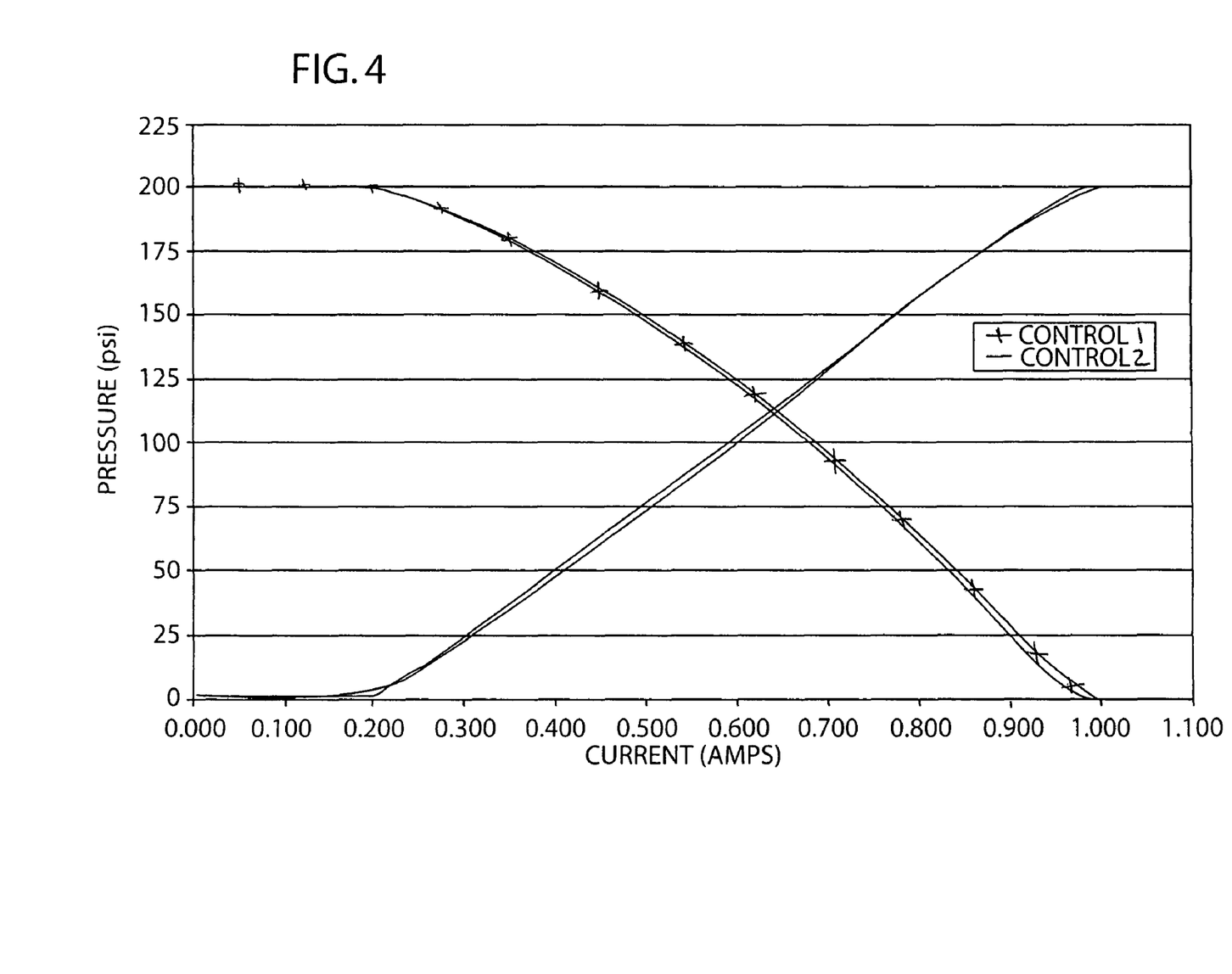
FIG. 4 is a graph of solenoid current from 0 to 1100 mA versus pressures at the control ports at a supply pressure of 200 psi for a fluid control valve pursuant to the invention.

FIG. 3 is a graph of solenoid current versus pressures at the control ports at different supply pressures of 40 psi, 60 psi, or 80 psi as solenoid current is varied for a fluid control valve pursuant to the invention. A typical fluid control valve for use with a cam phasing mechanism pursuant to the invention can operate at a pressure range of 40-120 psi and an oil flow of about 4-5 gallons per minute using a valve package (e.g. valve housing) having a diameter of only 25 mm for purposes of illustration and not limitation. FIG. 4 is a graph of solenoid current from 0 to 1100 mA versus pressures at the control ports at a supply pressure of 200 psi for a fluid control valve pursuant to an embodiment of the invention. The high resolution and high range of FIG. 4 permits high flexibility for other applications such as multi-spool transmission control.

Figure 5:
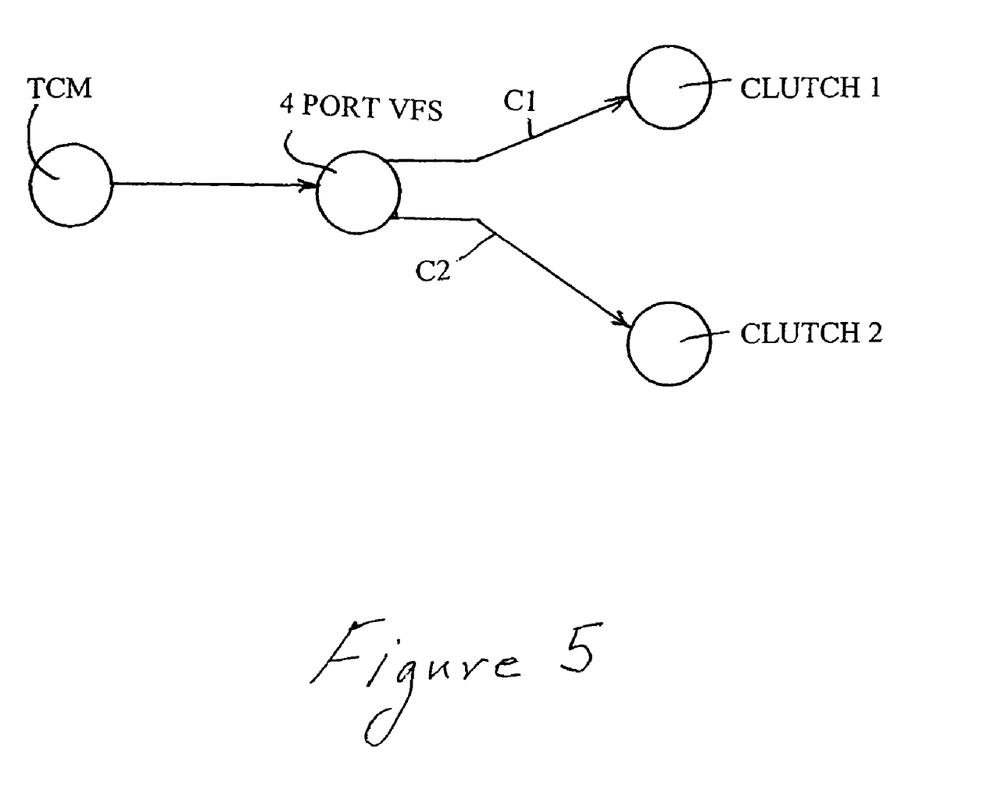
FIG. 5 is a schematic diagram of an automatic transmission clutch control system of a vehicle using a fluid control valve of the invention.

FIG. 5 is a schematic diagram of an automatic transmission clutch control system using a fluid control valve of the invention. In particular, a transmission control module TCM sends control signals to a fluid control valve designated "4 Port VFS" pursuant to the invention described above, which controls a first hydraulic clutch and second hydraulic clutch of the transmission. Use of the fluid control valve pursuant to the invention is advantageous to allow for more flexible pressure control in an automatic transmission that employs clutch-to-clutch control strategy. The fluid control valve pursuant to the invention allows a normally rising pressure clutch and a normally low falling pressure clutch to be controlled with one solenoid fluid control valve having the two control ports C1, C2. Use of only one fluid control valve pursuant to the invention in this way allows for lower costs, smaller package size due, and lower current consumption all due to less required hardware; one solenoid fluid control valve. In contrast, current transmission clutch control systems require a 3-port normally high solenoid control valve and a separate 3-port normally low solenoid control valve for the respective first and second each clutch.

The invention also envisions disposing a particle gettering magnet M, such as a permanent magnet, at a location in the supply port S, FIGS. 1 and 2, and/or in a supply passage of the manifold of the cam phasing mechanism to getter and remove ferrous contaminants from the fluid (i.e. engine oil).

The solenoid fluid control valve pursuant to the invention provides high flow capability, higher control pressure resolution for system calibration flexibility, much higher hydraulic forces acting on the spool, much reduced hydraulic hysteresis, fast transient pressure response due to low inductance generated by the coil/permanent magnet, and can embody smaller package size requirements.

Although the invention has been described in detail in connection with certain embodiments, those skilled in the art will appreciate that the invention is not limited thereto and that changes and modifications can be made thereto within the scope of the appended claims.

We claim:

1. Solenoid operated fluid control valve, comprising first and second control ports, a hydraulically pilot-actuated, pressure balanced spool having a control feedback passage communicated to one of the first and second control ports and having a spool supply recess for communication to one or the other of the first and second control ports depending on a first position or a second position of the spool, and a linear force solenoid actuator motor for controlling a pilot valve that controls movement of the spool between the first position and the second position.

2. The valve of claim 1 wherein the first control port and the second control port both are communicated to the spool supply recess when the spool is moved between the first position and the second position.

3. The valve of claim 1 wherein the spool includes an exhaust path common to pilot and spool exhaust exhaust passages.

4. The combination of a cam phasing mechanism of an internal combustion engine and a fluid control valve of claim 3 wherein the first and second control ports are communicated to respective inlets of the cam phasing mechanism.

5. The combination of a transmission clutch control system of a vehicle and a fluid control valve of claim 3 wherein the first and second control ports are communicated to respective first and second clutches of the clutch control system.

6. The valve of claim 1 wherein the spool is disposed in the first position when the motor is deenergized where a supply pressure port is open to a first control port, the first control port is communicated to the control feedback passage, the first control port is closed to an exhaust port, the supply pressure port is closed to a second control port, and the second control port is open to the exhaust port with the pilot valve closed on a valve seat.

7. The valve of claim 6 wherein the control feedback passage communicates to an end of the spool to provide supply pressure thereto.

8. The valve of claim 6 wherein the spool is disposed in the second position when the motor is energized where the supply pressure port is open to the second control port, the second control port is closed to the exhaust port, the supply pressure port is closed to the first control port, and the first control port is communicated to the exhaust port with the pilot valve opened off of the valve seat.

9. The valve of claim 8 wherein the control feedback passage communicates exhaust to an end of the spool when the motor is energized.

10. The valve of claim 1 wherein the actuator motor comprises a solenoid coil, an armature movable in response to electrical current applied to the solenoid coil in a manner that an inner end thereof controls movement of the pilot valve, and a permanent magnet disposed about an opposite remote end of the armature proximate the solenoid coil.

11. The valve of claim 1 including a particle gettering magnet to remove ferrous contaminants from the fluid.

12. The combination of a cam phasing mechanism of an internal combustion engine and a fluid control valve of claim 1 wherein the first and second control ports are communicated to respective inlets of the cam phasing mechanism.

13. The combination of a transmission clutch control system of a vehicle and a fluid control valve of claim 1 wherein the first and second control ports are communicated to respective first and second clutches of the clutch control system.

14. Solenoid operated fluid control valve having a pilot valve, a hydraulically pilot-actuated spool that controls fluid pressure at a control port, a single exhaust port, said spool having a longitudinal exhaust passage communicating a pilot exhaust passage and also a spool exhaust passage to said single exhaust port, and a solenoid actuator motor for controlling the pilot valve for the spool.

15. The valve of claim 14 wherein the spool includes the longitudinal exhaust passage that communicates a pilot chamber and also the spool exhaust passage to said single exhaust port.

16. A method of controlling fluid pressure at first and second control ports, comprising moving a pressure balanced spool between first and second positions corresponding to first and second control pressures using a solenoid-actuated pilot valve controlled by a linear force solenoid actuator motor, and exhausting fluid from pilot and spool exhaust passages through a common spool exhaust path to an exhaust port.

17. The method of claim 16 wherein the actuator motor is deenergized at the first position and wherein a supply pressure port is open to a first control port, the first control port is communicated to a control feedback passage, the first control port is closed to an exhaust port, the supply pressure port is closed to a second control port, and the second control port is open to the exhaust port with a pilot valve closed on a valve seat.

18. The method of claim 16 wherein the actuator motor is energized at the second position and wherein the supply pressure port is open to the second control port, the second control port is closed to the exhaust port, the supply pressure port is closed to the first control port, and the first control port is open to the exhaust port with the pilot valve opened off of the valve seat.

19. The method of claim 16 including moving the spool between the first and second positions in linear proportional manner to electrical current provided to the actuator motor.

20. The method of claim 16 including communicating the first control port and the second control port to a respective inlet of a cam phasing mechanism of an internal combustion engine.

21. The method of claim 16 including communicating the first control port and the second control port to a respective clutch of a transmission control system.

22. A method of controlling fluid pressure at first and second control ports using a spool, comprising moving the spool using a solenoid-actuated pilot valve so that the spool controls fluid pressure at first and second control ports and exhausting fluid from a pilot exhaust passage and also from a spool exhaust passage through a common spool exhaust path to a single exhaust port.

23. A method of controlling fluid pressure, comprising moving a spool from a pressure balanced position, where opposite ends of the spool are fluid pressure balanced, to another spool position using a pilot valve controlled by a solenoid actuator motor wherein the pilot valve receives supply pressure via a supply passage in the spool and wherein pilot valve exhaust communicates through a longitudinal passage in the spool to an exhaust port.

* * * * *